Patented Feb. 2, 1926.

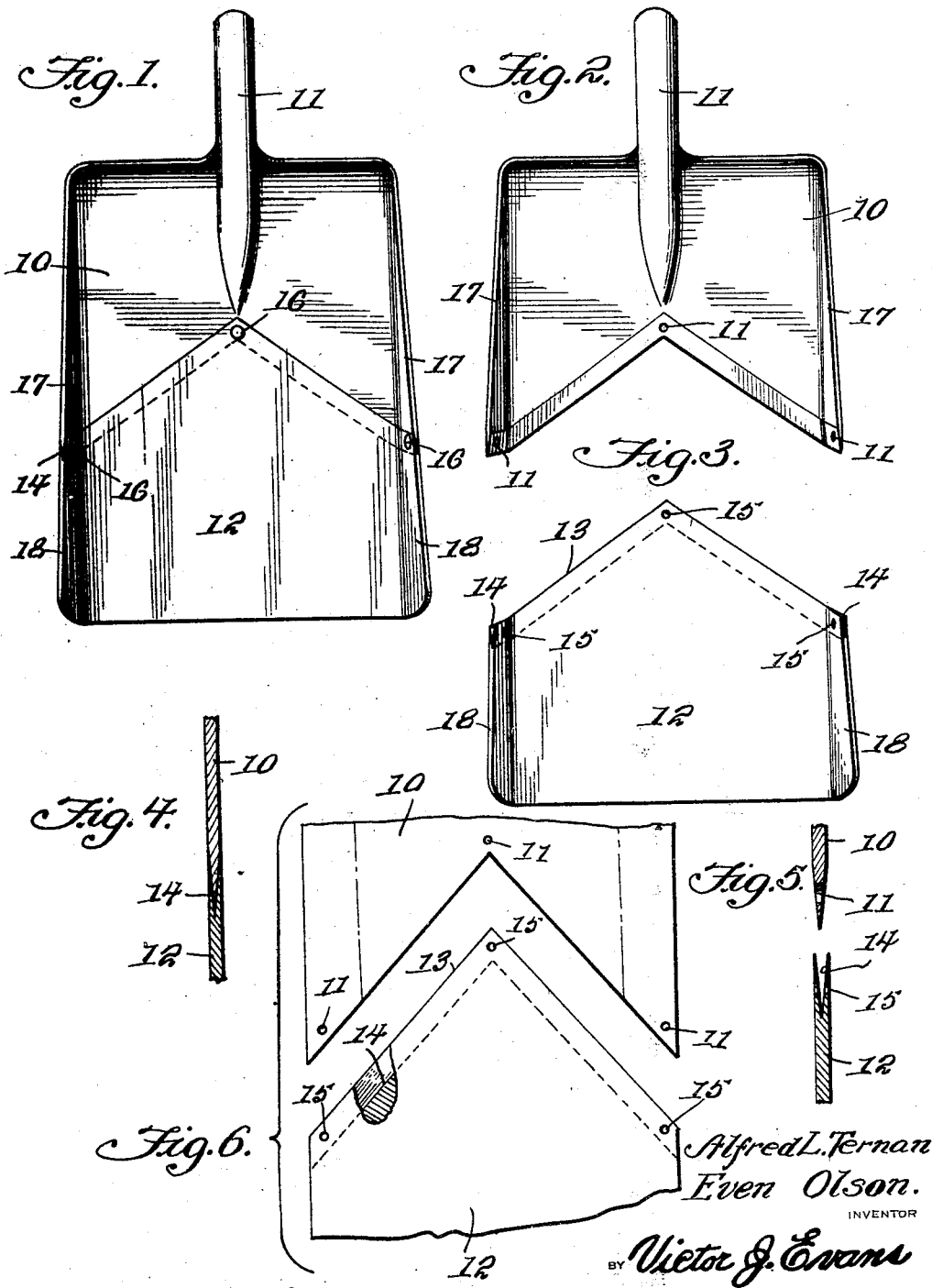

1,571,818

UNITED STATES PATENT OFFICE.

ALFRED L. TERNAN AND EVEN OLSON, OF QUARTZBURG, IDAHO.

RENEWABLE SHOVEL.

Application filed May 12, 1924. Serial No. 712,732.

*To all whom it may concern:*

Be it known that we, ALFRED L. TERNAN and EVEN OLSON, citizens of the United States, residing at Quartzburg, in the county of Boise and State of Idaho, have invented new and useful Improvements in Renewable Shovels, of which the following is a specification.

This invention relates to ground working implements and the like, particularly to shovels, and has for its object the provision of a shovel, spade or analogous implement so constructed and arranged that when the active end portion thereof becomes worn out and short it may be removed and replaced by a new end portion so that the entire implement will be as good as new, the invention having the great advantage of economizing in the cost of equipment of this character especially in mines, gravel and sand pits or other places where shovels are used extensively.

An important object is the provision of a shovel of this character which is initially so constructed that the new point or end may be easily placed in position and positively secured so that the completed device will have substantially the same rigidity as if it were constructed all in one piece.

An additional object is the provision of an implement of this character which will be simple and inexpensive in manufacture, efficient and durable in service and a general improvement in the art.

With the above and other objects and advantages in view, the invention consists in the details of construction to be hereinafter more fully described, claimed and illustrated in the accompanying drawings, in which:—

Figure 1 is an elevation of a shovel constructed in accordance with our invention, showing the parts connected.

Figure 2 is a similar view showing the two sections or parts disconnected.

Figure 3 is an elevation of the removable end or point.

Figure 4 is a detail cross sectional view showing the joint.

Figure 5 is a detail section taken through the rivet holes and showing the two sections separated.

Figure 6 is a view of the blank from which the shovel is formed.

Referring more particularly to the drawing, the numeral 10 designates the body or permanent portion of the shovel which is constructed from sheet metal in the usual manner and which has the same general shape at its upper or rear portion as an ordinary variety. This portion is formed with a tubular ferrule 11 or its equivalent into which the handle may be inserted, although it is to be understood that there is absolutely no restriction whatever as to the exact manner of attaching the handle as it really forms no part of the present invention.

The free end, or end most remote from the handle, of the body portion 10 is formed in a V-shape as clearly indicated in Figure 3, and is provided with a plurality of holes 11 for a purpose to be described.

The shovel further includes a removable and renewable end portion 12 which is adapted to form a continuation of the portion 10 and which has its rear or upper edge 13 V-shaped for interfitting engagement with the V-shape edge or end of the portion 10. The edge 13 of the portion 12 is slotted as shown at 14 and intersecting these slots are holes 15 adapted to be brought into registration with the previously described holes 11 for the passage of rivets 16 by means of which the two parts or sections may be rigidly secured together.

In the case of a spade it is quite obvious that there would be practically no side to the shovel or device so in case of a coal scoop or the like it is quite apparent that the shovel would be formed with sides or wings on the two sections, the wings being represented by the numerals 17 and 18. As these wings are formed integrally upon the remaining portion it is quite apparent that they have substantially the same shape and that the wings 18 are slotted, the slots forming continuations of the above described slots 14.

The shovel is used of course in exactly the same manner as any other, but it has the great advantage that when the end portion 12 becomes bent, worn, short or otherwise unfit for use, the rivet 16 may be knocked out and a new end piece applied in position and secured by means of new rivets. In this way it is quite apparent that the life of the implement may be greatly prolonged as any desired number of new pieces may be applied from time to time as necessary.

While we have shown and described the preferred embodiment of the invention, it is to be understood that we reserve the right to make such changes in the form, construction and arrangement of parts as will not depart from the spirit of the invention or the scope of the subjoined claim.

Having thus described the invention, we claim:

In a shovel, a body portion provided with handle attaching means and having its edge most remote from the handle attaching means tapered off at both sides to define a wedge shape, and a removable end portion adapted to be secured to the body portion and having one edge formed with a slot V-shaped in cross section for conforming engagement upon the wedge shaped edge of the body, and securing members passing through the slotted portion of the removable end and through the body, the body portion and removable end being of the same thickness whereby both surfaces thereof will be flushed.

In testimony whereof we affix our signatures.

ALFRED L. TERNAN.
EVEN OLSON.